Figure 1:
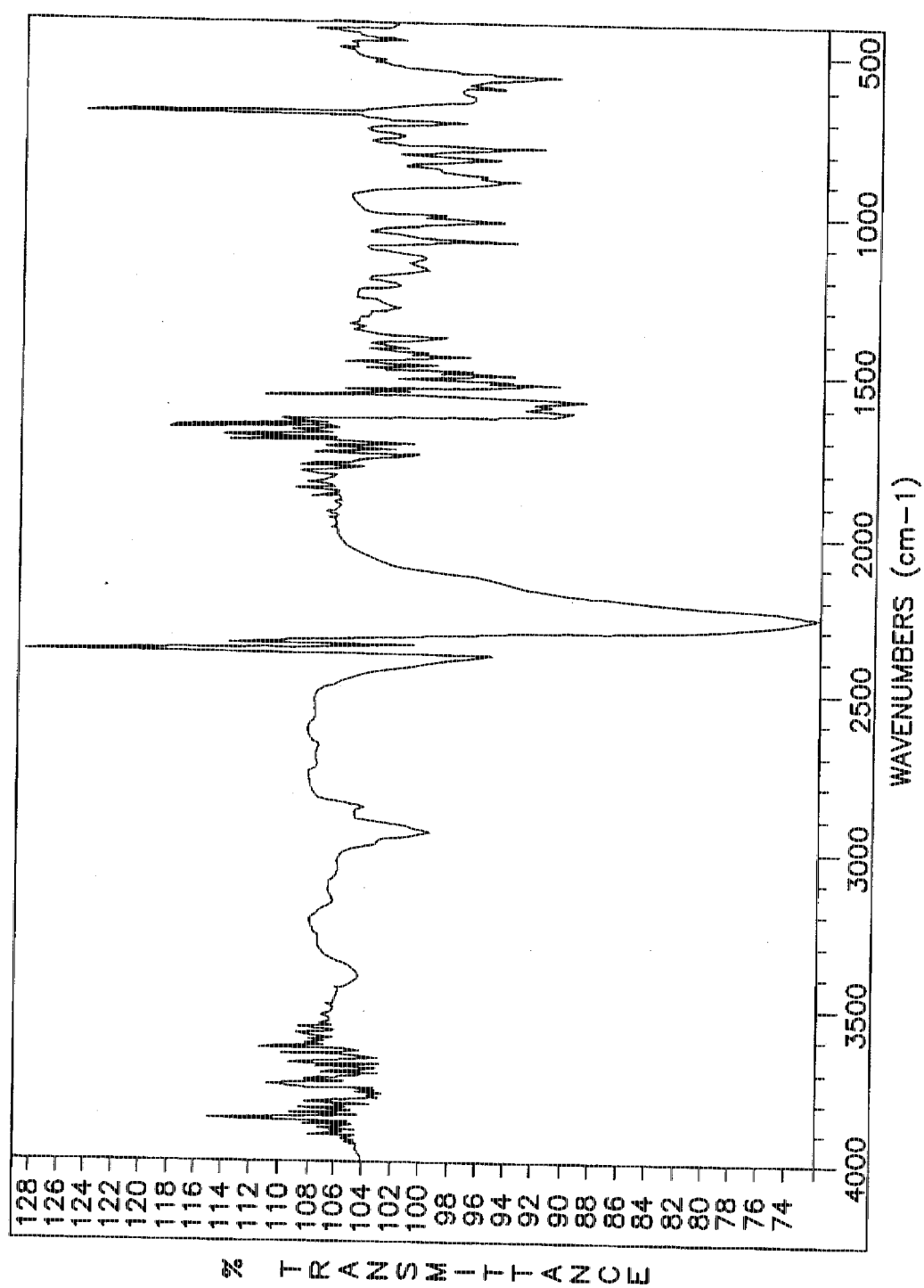

United States Patent [19]

Bensky

[11] Patent Number: 5,713,963
[45] Date of Patent: Feb. 3, 1998

[54] METHOD FOR MAKING COLORED CONTACT LENSES AND COLOR COATING COMPOSITION

[76] Inventor: Freddie Bensky, Konalantie 18 E, Helsinki, Finland, 00370

[21] Appl. No.: 535,109
[22] PCT Filed: Jun. 5, 1995
[86] PCT No.: PCT/FI94/00178
  § 371 Date: Nov. 6, 1995
  § 102(e) Date: Nov. 6, 1995
[87] PCT Pub. No.: WO94/27178
  PCT Pub. Date: Nov. 24, 1994

[30] Foreign Application Priority Data

May 6, 1993 [FI] Finland ................... 932062

[51] Int. Cl.$^6$ ................... D06P 5/00; C08J 7/04
[52] U.S. Cl. ................... 8/507; 8/552; 8/602
[58] Field of Search ................... 8/552, 507, 515, 8/602

[56] References Cited

U.S. PATENT DOCUMENTS

| | | | |
|---|---|---|---|
| 4,373,009 | 2/1983 | Winn | 428/424.2 |
| 4,668,240 | 5/1987 | Loshaek | 8/507 |
| 4,857,072 | 8/1989 | Narducy et al. | 8/507 |
| 5,219,638 | 6/1993 | Imamura et al. | 428/195 |

FOREIGN PATENT DOCUMENTS

| | | |
|---|---|---|
| 0404111 | 12/1990 | European Pat. Off. . |
| 58-199192 | 11/1983 | Japan . |
| 01005883 | 1/1989 | Japan . |
| 03247491 | 11/1991 | Japan . |

*Primary Examiner*—Margaret Einsmann
*Attorney, Agent, or Firm*—Merchant, Gould, Smith, Edell, Welter & Schmidt, P.A.

[57] ABSTRACT

The invention relates to a procedure for staining a contact lens, wherein at least part of the surface of the lens consisting of a polymer containing hydroxyl and/or carboxyl groups is coated with a color coating containing as polymer-cross-linking agent a compound with at least two urethane groups or a mixture of such compounds, and urethane exchange is effected for causing cross-linking of polymers, by reacting the urethane groups with the hydroxyl and/or carboxyl groups of the bonding agent polymer and of the lens polymer.

13 Claims, 3 Drawing Sheets

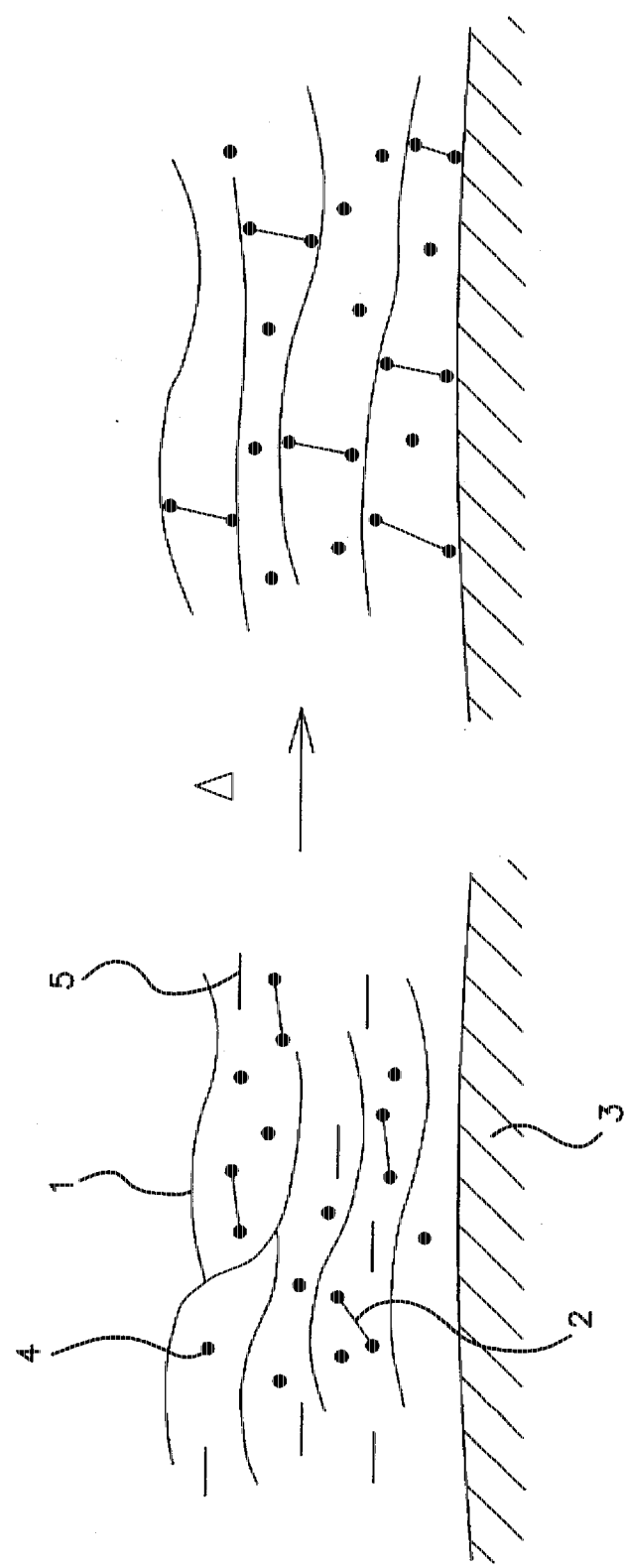

METHOD FOR MAKING COLORED CONTACT LENSES AND COLOR COATING COMPOSITION

The present invention concerns a procedure for staining contact lenses and a colour coating formulation for use in the procedure.

The purpose of stained contact lenses is to change the apparent color of the wearer's iris. In a staining technique used at present, a colour coating configuration is produced on the surface of contact lenses with a view to achieving an impression which is as natural as possible.

The coating may be accomplished by imprinting a colour mix containing bonding agent polymer, colour substance and possibly solvent and other substances modifying the polymer, and of which the viscosity has been adapted to be appropriate for the printing process. The colour coating formed by printing is then affixed to the lens surface. This adhering takes place by chemically curing the bonding agent polymer.

The contact lens staining technique has its deficiencies when one considers the printing technique, permanence and wear resistance of the stain, wearing comfort and interaction between printing and lens.

Towards affixing the colour coating, difunctional agents have been used which cause cross-linking between the bonding agent polymer contained in the colour coating and the polymer of the lens. In the contact lens manufacturing procedure disclosed in the Patent FI-84111, in the colour coating is used a compound containing, among others, two isocyanate groups, for affixing the colour coating. In the procedure of this reference the bonding agent polymer and the lens polymer are bonded together by means of a reaction between said isocyanate groups and hydroxyl, carboxyl and/or amino groups. It has now been found that the arrangement falls to work in practice. The cause responsible is untimely reaction of the highly reactive isocyanate groups with polymers containing functional groups of the types mentioned. For instance, when the diisocyanate compound is added to a printer's ink mixture of the generally known HEMA (hydroxyethylmethacrylate) bonding agent polymer, the compound reacts immediately with the bonding agent polymer, gelifying the mixture, thus rendering printing infeasible. Furthermore, isocyanates are substances highly harmful to human health, and therefore their use in a contact lens staining procedure involves a health risk.

The object of the present invention is to eliminate the drawbacks mentioned.

The object of the invention is specifically, to disclose a procedure enabling convenient coating of contact lenses with a colour coating containing cross-linking agent, and by which firm fixing of the colour coating on the lens surface is attained.

The object of the invention is, further, to disclose a colour coating information for contact lens coating.

Regarding the features characterizing the invention, reference is made to the claims.

In the procedure of the invention, at least part of the surface of a lens consisting of polymer containing hydroxyl and/or carboxyl groups is coated with a colour coating containing colour matter, bonding agent polymer containing hydroxyl and/or carboxyl groups and as polymer-cross-linking agent a compound containing at least two urethane groups, or a mixture of such compounds. The colour coating is affixed on the lens surface by curing the bonding agent and by effecting a controlled urethane exchange reaction.

It has now unexpectedly being found in studies connected with the invention that urethane compounds containing at least two urethane groups can be used to cross-link bonding agent polymers and lens polymers. It was found in the studies that it is possible in a lens arrangement coated as above described, to effect a controlled urethane exchange reaction by reacting the urethane groups in appropriate conditions with the hydroxyl and/or carboxyl groups of the bonding agent polymer and the lens polymer. Thanks to the new urethane bonds thus formed, the polymers can be coupled with each other, that is, cross-linking is accomplished.

In the procedure of the invention, one uses for lens coating, advantageously, a colour coating formulation containing colour substance, bonding agent polymer in appropriate quantity so that its viscosity and degree of polymerization are adapted in view of the coating method employed and of the desired degree of curing, and a cross-linking urethane compound, or mixture of urethane compounds, in a quantity which will produce the desired cross-linking. The proportions of bonding agent polymer and urethane compound are selected to be such that the cured colour coating will comply with the desired hardness, wear-resistance and adhesion properties. The proportion of the urethane compound may be e.g. about 2–20% by weight of the bonding agent polymer weight.

The colour coating formulation may also contain solvent, by means of which one can, when necessary, adjust e.g. the viscosity, catalyst for the urethane exchange reaction, initiator for curing the bonding agent, and additives commonly used in colour coats.

Since the urethane compounds used in the procedure of the invention are less reactive with the bonding agent polymer and with the lens polymer than, e.g., the isocyanate compounds known through the state of art, the procedure successfully avoids the gelifying problems referred to in the foregoing. The cross-linking substance and the bonding agent polymer can thus be mixed together prior to the coating step.

According to an advantageous embodiment of the invention, the colour coating formulation is provided in the form of a mix, and it can be applied with ease, in one step, on the lens surface using any coating method whatsoever known in the art. The viscosity of said mix is advantageously adjusted with the aid of solvent to be appropriate for the coating method employed.

The coating is advantageously produced by printing, such as tampon printing. Colour coating formulation is advantageously imprinted in the way known in the branch on the lens surface to give a configuration simulating the structure of the iris.

It should be mentioned that, if desired, the colour coating process may equally be made to consist of several steps, in that at least part of the components of the colour coating formulation are separately deposited on the lens surface. The coating sequence may vary in such instances.

In order to fix the colour coating on the lens surface, the bonding agent is cured in previously known manner applying heat. When being cured, the bonding agent polymer forms a hard, wear-resistant polymer network which adheres to the lens which is being coated and bonds the colour substance thereto.

The urethane exchange reaction is performed in controlled manner by heating the coated lens. Heating is advantageously effected at about 80°–200° C., suitably about 100°–140° C. The cross-linking taking place in the urethane exchange reaction enhances the adhesion of the colour coating and increases its wear resistance and hardness.

The urethane exchange reaction and curing of the bonding agent can be implemented in an uninterrupted heating step. If required, the temperature may be raised by steps, in order to achieve desired effects. Furthermore, in connection with the heating step residual substances may be evaporated or decomposed, such as the initiator and the solvent.

The coated contact lenses may finally be hydrated.

By the procedure of the invention a hard and wear-resistant coating presenting good permanence of colour is achieved.

The cross-linking agent employed as taught by the invention is advantageously a diurethane compound. For diurethane compound any diurethane compound can be used which produces a urethane exchange reaction according to the procedure at a temperature of about 80°–200° C.

According to an advantageous embodiment, for diurethane compound are used compounds based on toluene diurethanes and/or hexamethylene diurethanes. Particularly advantageous among such compounds are compounds in which the exchangeable ester group of the urethane unit has been formed using oximes or aliphatic or aromatic alcohols. As examples may be mentioned toluene and hexamethylene diurethanes in which the exchangeable ester group of the urethane unit has been formed using methylethylketoxime (MEKO). The urethane compounds and their initial substances are known in themselves in the art and can be prepared by methods known from the relevant literature, starting e.g. from known isocyanate compounds and oximes or aliphatic or aromatic alcohols.

The bonding agent polymer contained in the colour coating formulation is understood to be material that has been formed by polymerizing monomers by the aid of free radical initiators. The bonding agent polymer comes in the form of a so-called prepolymer, containing some non-reacted monomer and residual free radical initiator, and possibly solvent. The bonding agent polymer can be formed from any monomer, or mixture of different monomers, known in the art so that the polymer which is formed contains side groups having a hydroxyl or carboxyl group as its functional group. Furthermore, use of various comonomers known in the branch is possible, in order to modify the properties of the bonding agent polymer which is being formed.

Of advantageous materials to be used in the bonding agent there may be mentioned hydroxyalkylmethacrylates or derivatives (HEMA) which on polymerization forms a polymer of the following kind:

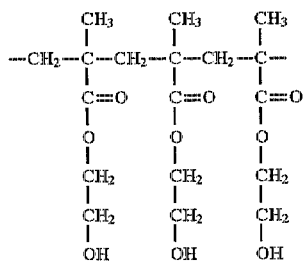

For free radical initiators in the prepolymerizing of the bonding agent polymers, and possibly in the colour coating to be cured, one may use any initiator known in the art. As an example, azo-bis-isobutyronitrile (AIBN) may be mentioned.

For solvent one may use e.g. tetrahydrofuran, alcohol, ketone, or another polar solvent, advantageously cyclohexanone or cyclopentanone.

For colour substance one may use any colour substances, generally approved in connection with contact lenses, producing changes of colour. One may also use substances causing opacity, such as titanium dioxide. The quantities of colour substance to be used vary in accordance with the colour substance(s) used any the effect desired.

The procedure of the invention is particularly well applicable in staining soft contact lenses. For contact lens advantageously a lens is selected in which the polymer has been formed of any known monomer or mixture of monomers so that the polymer contains hydroxyl and/or carboxyl groups as functional groups. An advantageous lens polymer is formed of hydroxyalkylmethacrylate, such as hydroxyethylmethacrylate.

The bonding agent polymer and the lens polymer are advantageously selected so that their chemical and physical properties are as close to each other as possible.

The procedure of the invention is easy to implement as regards printing technology even though the colour coating formulation that is used contains cross-linking substance.

Furthermore, the cross-linking agent used in the invention enables improved fixing of the colour coating. Moreover, working with the cross-linking agent used in the invention implies considerably higher safety compared with earlier cross-linking agents such as isocyanate compounds.

Figure 2:
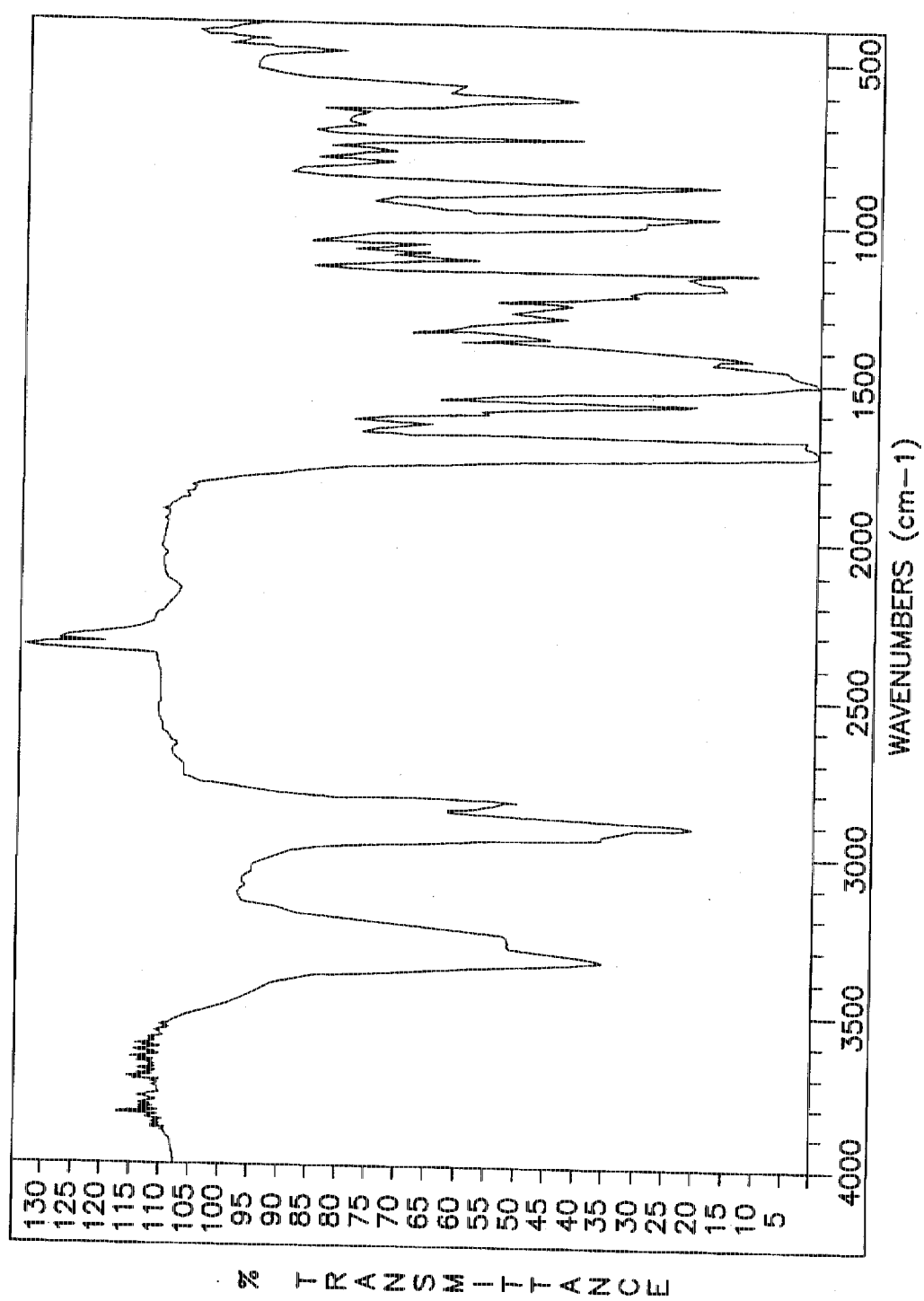

The invention is desired in the following with the aid of an embodiment example, referring to the figures, wherein FIGS. 1 and 2 present the infra-red spectra of the cross-linking agent employed in a test, revealing the peaks typical of the isocyanate group and the urethane group, and FIG. 3 illustrates the changes taking place in the colour coating/lens system during the heating step.

EXAMPLE (1) Preparation of the bonding agent polymer:

In a 1-liter reaction vessel, fitted with mixer, in a heating bath are introduced:

| Cyclohexanone | 163.5 g | 54.5% by weight |
|---|---|---|
| AIBN (azo-bis-isobutyronitrile) | 1.5 g | 0.5% by weight |
| Methacrylic acid | 1.5 g | 0.5% by weight |
| Mercaptoethanol | 1.5 g | 0.5% by weight |
| HEMA | 132.0 g | 44.5% by weight |

The temperature of the bath is controlled to be 70° C., and mixing is started. Polymerization time with the quantities used is about 16 hrs. The polymerizing time is chosen so that suitable viscosity of the ultimate mixture is obtained.

The product thus obtained has syrupy viscosity (order of magnitude about 100 Pa·s±50%). The prepolymer mix obtained on polymerization contains nearly all the solvent added (some of it evaporates during polymerizing), some non-reacted HEMA, and residual free radical initiator, AIBN, about 15% of the original quantity.

The ultimate viscosity of the bonding agent polymer can be adjusted by evaporating or adding solvent. The product is kept in a closed container, in the dark and preferably in a refrigerator.

(2) Preparation of the cross-linking agent:

A mixture of two diurethane compounds is prepared, starting from toluene diisocyanate (TDI) and hexamethylene diisocyanate (HDI), which are commonly known compounds. Regarding TDI, reference is made to U.S. Pat. No. 3,746,689.

For forming the urethane bond methylethylketoxime (MEKO) is used, which is a commonly known compound, in stoichiometric proportion, that is 2 times the mol quantity per mol quantity of diisocyanate used, and to the stoichiometric quantity is added an excess of about 30–30%.

9.6 g of TDI, 2.4 g of HDI and 13 g of MEKO are reacted in 25 g of THF solution. The reaction is exothermal. On termination of heat generation the mixture is kept for some further time at 80° C. until the reaction has run to the end. Completion of reaction can be observed e.g. by IR spectrometry. The peak typical of the isocyanate group occurs at 2273 cm$^{-1}$ (FIG. 1). The typical peaks of the urethane group appear at about 1754 and 3339 cm$^{-1}$ (FIG. 2).

The toluene diurethane proportion of the mixture thus obtained is found to be 80% and the hexamethylene diurethane proportion, 20%. The mixture is used as it is.

(3) Preparation of colour coating mix usable in printing:

A colour coating mix is prepared with the following formulation:

| | |
|---|---|
| Bonding agent polymer produced as in (1) | 100.0 g |
| AIBN in cyclopentanone | alternative |
| Amine catalyst | 0.2 g |
| Diurethane compound mixture (24% by weight) produced as in (2) | 2–6 g |
| Colour substance | quantity desired |

The components are scrupulously mixed. The viscosity can be adjusted with solvent if needed.

(4) Coating of contact lenses:

The lenses are coated by imprinting on the lens surface, by the tampon method, colour coating mix as obtained in (3).

(5) Fixing the colour coating on the lens surfaces:

The colour coating is fixed on the lens surfaces by heating the lenses in an oven, whereby the bonding agent is chemically cured and urethane exchange reaction takes place. FIG. 3 schematically depicts the changes taking place in the coated lens arrangement during heating. In FIG. 3: 1 is the bonding agent polymer, 2 the cross-linking substance, 3 the lens surface, 4 the colour substance, 5 is the solvent, and Δ refers to heating.

Temperature raising is performed e.g. in two steps, so that a temperature of about 75° 90° C. is maintained for about 15 min. and the temperature is then elevated to about 130°–135° C. for a duration of about 20–30 min.

In the heat treatment moreover the solvent and the residual volatile non-reacted components are evaporated.

The heat treatment is advantageously implemented in partial vacuum, such as in a vacuum oven. If the heat treatment takes place under atmospheric pressure, a protective gas is used, e.g. nitrogen.

(6) Hydration of the coated lenses:

Upon heat treatment the dry lenses are immersed in physiological saline and the lenses are boiled therein for about 0.5 hrs. Water is thereby absorbed into the lenses from the solution, and the solution dissolves potential non-reacted components that are left in the lenses.

ADDITIONAL EXAMPLE

In the preparation of the bonding agent polymer mixture, and possibly of the colour coating mix, e.g. the following initiators can be used instead of AIBN initiator:

| | |
|---|---|
| VP 1230 | 1,1,4,4,7,7, hexamethyl-cyclo-4,7-diperoxynonane, |
| | 2,5-dimethyl-2,5-bis-(tert. butylperoxy)hexine, |
| DTBP | di-tert. butylperoxide, |
| CUHP | cumolhydroperoxide 80%, |
| TBHP | tert. butylhydroperoxide 80%, |
| | 2,5-dimethyl-2,5-bis-(tert. butylperoxy)hexane, |
| DCP | dicumylperoxide, |
| TBPB | tert. butylperbenzoate, |
| BPB | 2,2,-bis-(butylperoxy)butane, |
| | di-tert. . . butyldiperphthalates, |
| P 1335 | tert. butylperisononanate, |
| TBPA | tert. butylperacetate, |
| P 1380 | 2,5-dimethylhexane-2,5-diperbenzoate, |
| P 1253 | 3,5,5-trimethyl cyclohexanone perketal, |
| TBPW | mono-tert. butylpermaleinate, |
| P 1313 | tert. butylperisobutyrate, |
| p-ClBP | p-chlorobenzoylperoxide, |
| P 1310 | |
| BP | benzoylperoxide, |
| DAP | diacetylperoxide, |
| SUCP | succinylperoxide, |
| | propionylperoxide, |
| | capryloylperoxide, |
| LP | lauroylperoxide, |
| | decanoylperoxide, |
| P 1600 | isononancylperoxide, |
| P1330 + | |
| DCP | dichlorobenzoylperoxide, |
| IPP | isopropylperoxide carbonal, |
| P 1654 | α-ethylhexylperoxide carbonate, |
| P 1652 | cyclohexylperoxide carbonate, |
| P1555 | acetylcyclohexane sulphonylperoxide, or mixtures of these. |

The bonding agent polymer is prepared using the starting substances mentioned under "EXAMPLE", but the quantities are selected so as to make the viscosity of the bonding agent polymer product used in preparing the colour coating mix be within the range from about 10 to 1000 Pa·s.

The examples are only meant to illustrate the invention, without confining it.

I claim:

1. Procedure for staining a contact lens, at least part of the surface of the lens consisting of a polymer containing hydroxyl or carboxyl groups being coated with a colour coating containing colour substance, bonding agent polymer containing hydroxyl or carboxyl groups and substance which cross-links polymers, and the colour coating being fixed on the lens surface, characterized in that (a) the lens is coated with a colour coating containing as polymer-cross-linking agent a compound with at least two urethane groups or a mixture of such compounds, and (b) urethane exchange is effected for causing cross-linking of polymers, by reacting the urethane groups with the hydroxyl or carboxyl groups of the bonding agent polymer and of the lens polymer.

2. Procedure according to claim 1, characterized in that the coated lens is heated in order to accomplish urethane exchange reaction.

3. Procedure according to claim 1, characterized in that the urethane exchange reaction is carried out at a temperature about 80°–200° C.

4. Procedure according to claim 3, characterized in that for cross-linking agent is used a diurethane compound producing urethane exchange reaction at a temperature about 80°–200° C.

5. Procedure according to claim 4, characterized in that for cross-linking agent is used toluene diurethane or hexamethylene diurethane wherein the exchangeable ester group of the urethane unit has been formed using an oxime or an aliphatic or aromatic alcohol.

6. Procedure according to claim 5, characterized in that cross-linking agent is used about 2–20% by weight of the weight of bonding agent polymer.

7. Procedure according to claim 6, characterized in that the colour coating is imprinted on the lens surface as a colour coating mix containing bonding agent polymer, colour substance, diurethane compound and solvent.

8. A colour coating formulation for coating the surface of a contact lens formed of an hydroxyalkylmethacrylate and for fixing the coating thereto, the colour coating formulation comprising:

a bonding agent polymer which comprises hydroxyl or carboxyl groups, a colour substance, and a polymer-cross-linking agent;

the bonding agent polymer being poly(hydroxyalkylmethacrylate);

wherein the polymer-cross-linking agent is a compound containing at least two urethane groups, or a mixture of such compounds, cross-linking being accomplished by the aid of a urethane exchange reaction.

9. Colour coating formulation according to claim 8, characterized in that the cross-linking agent is a diurethane compound producing urethane exchange reaction at a temperature about 80°–200° C.

10. Colour coating formulation according to claim 8, characterized in that the cross-linking agent is toluene diurethane or hexamethylene diurethane wherein the exchangeable ester group of the urethane unit has been formed by using an oxime or an aliphatic or aromatic alcohol, or a mixture of these.

11. Colour coating formulation according to claim 8, characterized in that the proportion of cross-linking agent is about 2–20% by weight, referred to the weight of bonding agent polymer.

12. Colour coating formulation according to claim 8, characterized in that the colour coating formulation is in the form of a colour mix to be applied on the lens surface by printing, containing bonding agent polymer, colour substance, diurethane compound and solvent.

13. The color coating formulation of claim 8, wherein the bonding agent polymer is poly(hydroxyethylmethacrylate).

* * * * *